(12) United States Patent
Liu et al.

(10) Patent No.: US 9,357,521 B2
(45) Date of Patent: May 31, 2016

(54) DETERMINING AN ESTIMATED LOCATION OF A BASE STATION

(71) Applicant: Marvell World Trade Ltd., St. Michael (BB)

(72) Inventors: BoChih Liu, Shanghai (CN); Zhike Jia, Fremont, CA (US); Jing Yu, Shanghai (CN); Jian Chen, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 43 days.

(21) Appl. No.: 14/186,909

(22) Filed: Feb. 21, 2014

(65) Prior Publication Data

US 2014/0243013 A1 Aug. 28, 2014

Related U.S. Application Data

(60) Provisional application No. 61/770,053, filed on Feb. 27, 2013.

(51) Int. Cl.
*H04W 24/00* (2009.01)
*H04W 64/00* (2009.01)
*G01S 5/02* (2010.01)

(52) U.S. Cl.
CPC ........... *H04W 64/003* (2013.01); *G01S 5/0252* (2013.01); *G01S 5/0278* (2013.01)

(58) Field of Classification Search
CPC ... H04W 64/003; G01S 5/0252; G01S 5/0278
USPC .............................. 455/456.1–456.3; 370/338
See application file for complete search history.

(56) References Cited

U.S. PATENT DOCUMENTS

| | | | | |
|---|---|---|---|---|
| 7,925,205 | B2* | 4/2011 | Kennedy et al. | 455/11.1 |
| 2007/0121560 | A1* | 5/2007 | Edge | 370/338 |
| 2008/0306689 | A1* | 12/2008 | Kourogi et al. | 701/217 |
| 2011/0176523 | A1* | 7/2011 | Huang et al. | 455/456.1 |
| 2011/0260922 | A1* | 10/2011 | Zhang et al. | 342/451 |
| 2013/0267242 | A1* | 10/2013 | Curticapean et al. | 455/456.1 |
| 2013/0344886 | A1* | 12/2013 | Jarvis | G01S 5/02 455/456.1 |

* cited by examiner

*Primary Examiner* — Marcos Batista

(57) ABSTRACT

In some implementations, a system for determining an estimated location of a base station includes a server that receives location information from mobile devices located within a communication range of base stations of a wireless communication network, processes the location information, and stores the location information in a data repository. The location information includes a location of a mobile device, the location associated with an identifier of a base station and a received signal strength indication between the mobile device and the base station. The server excludes at least one location of the mobile device from a set of locations of the mobile device using a previously determined coverage area length and a previously determined transmission signal range, and calculates a geographic location of each base station using non-excluded locations of the mobile device by accessing a base station information table using an identifier of each base station.

30 Claims, 5 Drawing Sheets

DETERMINING AN ESTIMATED LOCATION OF A BASE STATION

CROSS REFERENCE TO RELATED APPLICATIONS

This disclosure claims the benefit of priority under 35 U.S.C. §119(e) of U.S. Provisional Application No. 61/770,053, filed Feb. 27, 2013, the disclosure of which is hereby incorporated by reference in its entirety.

FIELD OF USE

The present disclosure relates to determining an estimated location of a base station.

BACKGROUND

A mobile device can communicate wirelessly with a wireless communication network by employing radio frequency (RF) field propagation. The radio frequency, a frequency within the electromagnetic spectrum associated with radio wave propagation, is supplied to an antenna that creates an electromagnetic field that propagates through space. An element of a wireless communication network can be a base station, for example, a cell tower of a cellular network, or an access point of a wireless local area network (WLAN) or a wireless personal area network (WPAN). The base station can allow a mobile device to communicate with a wired network through an access gateway. Typically, the base station broadcasts a beacon signal providing key information necessary for mobile devices to connect to it. A base station can serve mobile devices located in a geographic area.

A mobile device can include one or more location-aware applications that are configured to perform location-based functions such as point-of-interest searching and transit routing. A mobile device equipped with a receiver of a global navigation satellite system (GNSS), such as Global Positioning System (GPS), can receive satellite data signals to determine a position estimate within several tens of meters of accuracy. In outdoor environments, a GNSS receiver can be associated with multiple base stations due to the mobile device being within a communication range of various wireless communication networks (e.g., inside a cellular network and a WLAN) at the same time. A mobile device located in a geographic area where GNSS signals may not be available or are weak (e.g., in or near buildings) can sometimes determine its location using the locations of the base stations to which the mobile device can detect and connect, if the locations of the base stations are known. The information about a base station can be easily collected and updated by scanning and detecting, and is independent of GNSS signals. However, the base station locations may not be available to mobile devices with GNSS receivers; even though, it may be available to wireless communication vendors.

SUMMARY

The present disclosure describes systems and techniques relating to determining an estimated location of a base station. A server system can receive a plurality of mobile device locations from location-aware mobile devices (e.g., GPS-enabled mobile devices) located within a communication range of base stations of a wireless communication network. The server system can process the data received from the mobile devices and store the data in corresponding data repository. The server system can calculate a geographic location of each base station and an uncertainty of each geographic location using the received locations of the mobile devices. The sever system can calculate, based on the estimated geographic location of the base station, a coverage area length of the base station using the received locations of the mobile devices. The server system can store base station information, the estimated geographic locations associated with the base stations, the uncertainty values associated with the estimated geographic locations, and the coverage area lengths associated with the base stations in a base station information table.

The described systems and techniques can be implemented so as to achieve one or more of the following advantages. A mobile device equipped with a GNSS receiver can use the locations of the base stations as a fallback position when the mobile device is unable to receive GNSS signals or when the GNSS signals received by the mobile device are weak. In addition, the locations of the base stations can be used to assist in determining which GNSS satellite the mobile device can connect to improve the time of GNSS signal acquisition. A mobile device not equipped with a GNSS receiver can use the locations of the base stations to determine a current location of mobile device.

Details of one or more implementations are set forth in the accompanying drawings and the description below. Other features, objects, and advantages may be apparent from the description and drawings, and from the claims.

DETAILED DESCRIPTION

Figure 1:
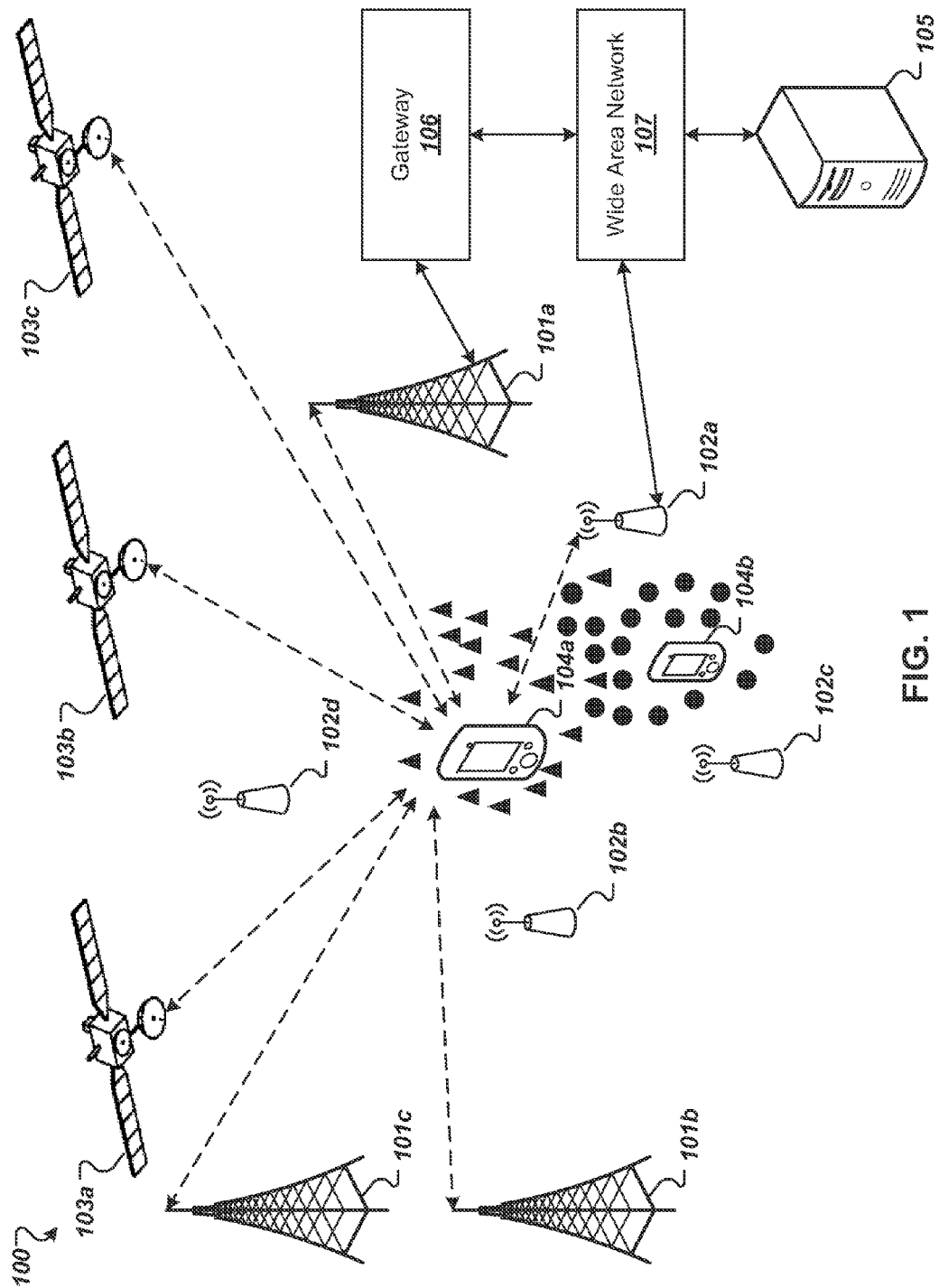
FIG. 1 is a diagram showing an example of a system for determining an estimated location of a base station.

FIG. 1 is a diagram showing an example of a system 100 of determining an estimated location of a base station. The base station can be, for example, a cell tower 101a of a cellular communication network, or an access point 102a of a wireless local area network (WLAN) or a wireless personal area network (WPAN). A base station can typically broadcast a beacon signal providing key information necessary for mobile device 104a to detect (or connect to) it. Multiple base stations 101a and 102a can be distributed in a geographic area.

Cell tower 101a can communicate with, using various cellular technologies, a mobile device 104a over longer distances than the access point 102a. In some implementations, the cell tower 101a can be a cell tower of a Global System for Mobile Communication (GSM) network with General Packet Radio Service (GPRS), or an Enhanced Data Rates for GSM Evolution (EDGE) network. In some implementations, cell tower 101a can be a cell tower of a Universal Mobile Telecommunications System (UMTS) network, or a Long Term Evolution (LTE) network. The cell tower 101a of a cellular communication network can broadcast a beacon signal providing an identifier (e.g., cell global identifier) for multiple mobile devices 104a and 104b to connect to it when the mobile devices 104a and 104b are within a communication range of the cell tower 101a. Multiple cell towers 101a, 101b, and 101c may be available to a mobile device 104a. As shown in FIG. 1, mobile device 104a can be connected to cell tower 101a, and cell tower 101a can be serving mobile device 104a. The serving cell tower 101a can provide mobile device 104a with telephony services and/or network (e.g., Internet) access. While mobile device 104a is connected to serving cell tower 101a, mobile device may receive beacon signals from neighboring cell towers 101b and 101c.

Access point 102a can communicate with the mobile device 104a using various communication protocols. In some implementations, access point 102a can be an access point of a WiFi network, which can be implemented using an Institute of Electrical and Electronics Engineers (IEEE) 802.11 based protocol (e.g., IEEE 802.11n). In some implementations, access point 102a can be an access point of a Bluetooth network, which can be implemented using an IEEE 802.15 based protocol. The access point 102a can broadcast a beacon signal providing an identifier (e.g., medium access control (MAC) address) for multiple mobile devices 104a and 104b to connect to it when mobile devices 104a and 104b are within a communication range of access point 102a. Multiple access points 102a, 102b, 102c, and 102d can be available to a mobile device 104a for connection. Those identifiers need not be associated with access points to which mobile device is connected or can connect. For example, mobile device 104a at a particular location (e.g., an airport) can be within communication range of, for example, one to 20 access points. Mobile device 104a may be capable of connecting to fewer access points than are within range (due to, for example, security setting of the access points and mobile device). Mobile device 104a may be actively connected to one or multiple access points, or no access points at all. Regardless of whether the mobile device 104a is connected to the access point, all identifiers of the access points received by mobile device can be used in the location estimate. As shown in FIG. 1, mobile device 104a is located within a communication range of assess point 102a in addition to access points 102b, 102c, and 102d. Mobile device 104a can identify access points 102a, 102b, 102c, and 102d under the wireless communication protocol used in a WiFi network. Access points 102a, 102b, 102c, and 102d can be identified by MAC addresses of the access points.

The system 100 can determine location data that are associated with base stations (e.g., cell towers 101a and/or access points 102a). The location data associated with each base station can include identifier information, a geographic location of the base station, an uncertainty value of each estimated geographic location, a coverage area length of the base station, and transmission signal range of the base station. Location data can be determined by server 105 in real-time, or at a particular time, or during a particular time period, independently from mobile device location determination operations of mobile device 104a. Server 105 can include a system of one or more computers connected to mobile devices 104a through a wired or wireless communication network.

The system 100 can make determine location data associated with the base stations based on known locations from the mobile devices 104a and 104b that are located within a communication range of the base stations 101a and 102a. The mobile devices 104a and 104b can each include circuitry and sensors for supporting positioning capability, such as that provided by GPS. A GNSS receiver (e.g., GPS receiver) can be built-in, or coupled with, each of the mobile devices 104a and 104b to provide access to location information. In outdoor environments, a mobile device 104a can perform mobile device location determination operations for running location-aware applications to implement location specific functions (e.g., point-of-interest searching). In response to a request, a mobile device 104a can communicate with the satellites 103a, 103b, and 103c through a GNSS receiver to retrieve satellite data signals to determine the transit time of each signal and calculate its distances to the satellites 103a, 103b, and 103c by using the speed of light. The mobile device 104a can use the calculated distance, the locations of the satellites 103a, 103b, 103c, and navigation equations to determine its geographic location. The location can be represented by geographic coordinates that include a latitude coordinate, a longitude coordinate, and an altitude coordinate of mobile device 104a.

In a geographic area that a mobile device 104a is located within a communication range of base stations 101a and 102a, the mobile device 104a may be associated with a single location (e.g., mobile device is standing still such that mobile device 104a can use the location to perform point-of-interest searching). Since mobile device 104a can use its locations to track its movement, mobile device 104a can be associated with multiple locations. In the example shown in FIG. 1, mobile device 104a or 104b can be associated with multiple locations represented by triangles or circles in FIG. 1.

When mobile devices 104a and 104b are located within a communication range of a particular base station (e.g., cell tower 101a or access point 102a), mobile devices 104a and 104b can transmit anonymous location information to the server 105 through a base station. In some implementations, mobile devices 104a and 104b can transmit anonymous location information to cell tower 101a. Cell tower 101a can relay the transmission, by providing communication access to a wide area network (WAN) 107, such as the Internet, by use of a gateway 106, to the server 105. In some implementations, mobile devices 104a and 104b can transmit anonymous location information to access point 102a. Access point 102a can relay the transmission, by providing communication access to a WAN 107, such as the Internet, to the server 105.

Server 105 can generate location data using data retrieving operations, data processing operations, and base station estimation operations. The data retrieving operations can include collecting anonymous location information from multiple mobile devices (e.g., mobile devices 104a and 104b) or a single mobile device 104a with multiple locations at in real-time, or at a particular time, or during a particular time period. A data point in the anonymous location information can include the location of mobile device 104a that is associated with an identifier of a base station (e.g., cell global identifier of cell tower 101a or MAC address of access point 102a), and additional information relating to communication between the mobile device and the base station. The additional information can include a received signal strength indication (RSSI) associated with the base station measured at the mobile device 104a. In some implementations, the additional information can include a round trip time of a signal between the mobile device and the base station. Data retrieving operations can produce a set of identifiers of base stations. Each of the identifiers of the base stations can tag a set of locations of the mobile devices. Each of the locations of the mobile devices can tag a RSSI value.

The data processing operations can filter the received locations of the mobile device 104a such that a limited number of locations of the mobile device, rather than a larger number of locations of the mobile device, are used in estimating the location of the base station. Filtering can be based on various factors, for example, a coverage area length of the base station and a transmission signal range of the base station.

The base station estimation operations can include location estimation and parameter estimation. Location estimation can generate a geographic location of each of the base stations and an uncertainty value of each geographic location from the received locations of mobile devices 104. Base station location estimation can calculate a geographic location of each of base station by employing a weighted function to the collected locations associated with each base station. Base station location estimation can assign a weight to each of the collected locations. Base station location estimation can include averaging the weighted locations. Base station location estimation can determine, based on the estimated geographic location of each base station, an uncertainty value of each geographic location using the received locations of mobile devices 104a. Further details of assigning weights to collected locations and calculating the geographic location of a base station will be discussed in more detail below with reference to FIG. 5.

Parameter estimation can generate the coverage area length of base stations (e.g., cell towers 101a and access points 102a). A coverage area length of a base station can indicate a distance of how far away the base station can be expected to be observed by a mobile device 104a. The coverage area length can be determined by applying a bounding box process. In some implementations, the bounding box can be determined by extreme points (e.g., easternmost, westernmost, northernmost, and southernmost points) as a rectangular area that contains the estimated geographic location of the base station as a center of the rectangular area. The extreme points within the boundaries of the bounding box can be calculated using a set of locations of the mobile device 104. The bounding box can be a rectangular area. By assuming the distribution of locations of the mobile device 104 in the set of locations can be a Gaussian distribution that contains the estimated geographic location of the base station as a mean, a threshold percentage of locations can be used to determine the coverage area length. The threshold percentage of locations can have a pre-specified value (e.g., 95 percent to reflect a confidence of estimate). In the bounding box, the coverage area length can include the threshold percentage of locations that are located within a communication range of the base station. The coverage area length can be a length that corresponds to the longest distance between two extreme points in the bounding box.

Parameter estimation can generate transmission signal ranges of base stations (e.g., cell towers 101a and access points 102a). A transmission signal range of each base station can indicate a RSSI value corresponding to how far away the base station can be expected to be measured by a mobile device 104. By assuming the distribution of RSSI values received at the mobile device 104 in the set of locations can be a Gaussian distribution that contains an average RSSI value as a mean, a statistical tolerance interval can determine a threshold percentage of RSSI values to be used to calculate the transmission signal range. The threshold percentage of RSSI values can have a pre-specified value (e.g., 95 percent to reflect a confidence of estimate). The transmission signal range can be a value that corresponds to a minimum RSSI value within which a certain percentage of RSSI values in the set of locations are measured.

Figure 2:
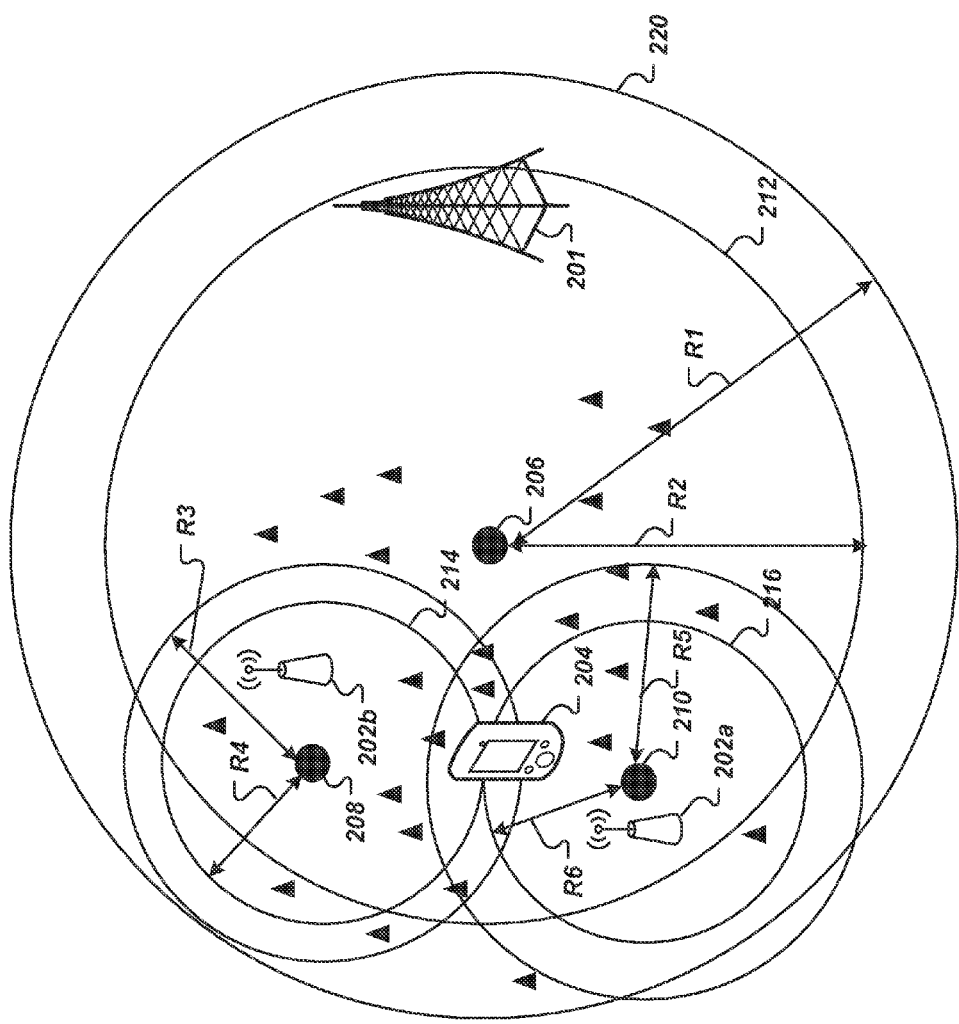
FIG. 2 is a diagram showing an example of base station location estimation based on a set of locations of a mobile device.

FIG. 2 is a diagram showing an example of base station location estimation based on a set of locations of a mobile device 204. The mobile device 204 can be, for example, a handheld computer, a personal digital assistant, a cellular telephone, a smart phone, an enhanced general packet radio service (EGPRS) mobile phone, a media player, a navigation device, or a combination of any two of these data processing devices or other data processing devices.

The mobile device 204 may be a GNSS-enabled mobile device located within a communication range of a cell tower 201. Cell tower 201 can broadcast a beacon signal providing an identifier (e.g., a cell global identifier) for mobile device 204 to connect to it. Mobile device 204 is connected to cell tower 201. Cell tower 201 can be serving mobile device 204. The cell tower 201 can provide mobile device 204 with telephony services and/or network (e.g., Internet) access. Mobile device 204 is within communication ranges of multiple access points 202a and 202b. Access points 202a and 202b can each broadcast a beacon signal providing an identifier (e.g., a MAC address) for the mobile device 204 to connect to it. Mobile device 204, due to, for example, security settings of the access points and the mobile device, may not be actively connected to one of the access points. However, all identifiers of the access points received by mobile device 204 can be used in estimating the location of a base station. The mobile device 204 may be moving such that the mobile device 204 is associated with multiple locations in the coverage area of the cell tower 201, as illustrated by multiple triangles in FIG. 2.

Mobile device 204 can transmit anonymous location information to cell tower 201. Cell tower 201 can relay the transmission, by providing communication access to a WAN by use of a gateway, to a server, such as server 105 of FIG. 1. The server can calculate, using the received set of anonymous location information, the geographic locations of base stations (e.g., cell tower 201, access point 202a, and access point 202b), the uncertainty values associated with geographic locations, the coverage area lengths associated with the base stations, and transmission signal range associated with base stations.

The estimated geographic locations (e.g., location 206, 208, and 210) of base stations (e.g., a cell tower 201, access point 202a, and access point 202b) being weighted can be contained in geographic regions 212, 214, and 216, respectively. Each of the estimated geographic locations 206, 208, 210 in the geographic regions 212, 214, 216 can include a latitude coordinate and a longitude coordinate. The estimated geographic locations 206, 208, and 210 need not correspond to the physical geographic locations of base stations 201, 202a, 202b. As an example shown, the physical location of base station 202a is inside the geographic region 216 associated with base station 202a.

Each of the estimated geographic locations 206, 208, and 210 can be associated with an uncertainty value. The uncertainty value can indicate an estimation accuracy of each of estimated geographic locations 206, 208, and 210. The uncertainty value can be designated as radius (e.g., R2) associated with a center (e.g. 206) of a geographic region. The center 206 can be the estimated geographic location of a base station 201, which can be a center of a circle (e.g., 212). In the example shown, the uncertainty values can be represented as radii R2, R4, and R6 associated with the estimated geographic locations 206, 208, and 210, respectively.

Each of the base stations 201, 202a, and 202b can be associated with a coverage area radius. A coverage area radius can determine an area where any mobile device located within a communication range of the base station is most likely located. The coverage area radius can be designated as radius (e.g., R1) associated with a center 206. The center 206 can be the estimated geographic location of the base station 201, which can be a center of a circle (e.g., 220). In the example shown, the values of the coverage area radius can be represented as radii R1, R3, and R5 associated with the estimated geographic locations 206, 208, and 210, respectively.

Figure 3:
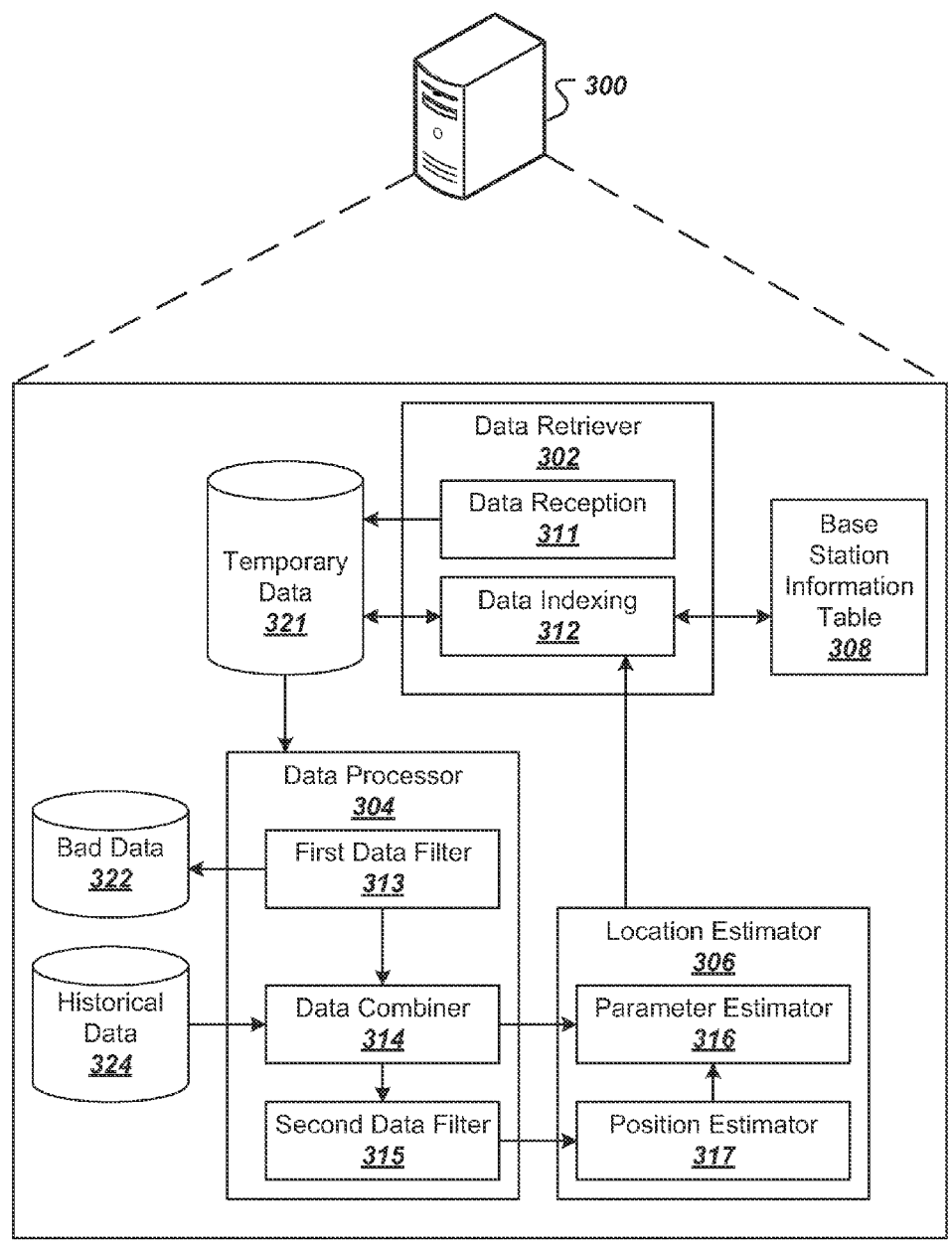
FIG. 3 is a block diagram showing functional components of an example of a server system for determining an estimated location of a base station.

FIG. 3 is a block diagram showing functional components of an example of a server system 300 for determining an estimated location of a base station. The server system 300 can include one or more processors, one or more memory devices storing the received data (e.g., received anonymous location information) and location data, and other hardware or software components. The server system 300 can be a subsystem of system 100 as described in reference to FIG. 1.

The system 300 can receive data from various mobile devices wirelessly connected to server system 300 through various base stations. The data can include multiple data points that can indicate locations of one or more GNSS-enabled mobile devices (e.g., mobile devices 104*a* or 104*b*), identifiers of base stations (e.g., cell global identifiers of cell towers 101 or MAC addresses of access points 102) indicating which base station mobile devices 104 have detected, as well as RSSI values associated with base stations as measured at mobile devices 104.

Data retriever 302 can include a data reception module 311, which can receive data transmitted from GNSS-enabled mobile devices through a network communication interface (e.g., software for implementing communication protocol, such as the Transmission Control Protocol/Internet Protocol (TCP/IP), Hypertext Transfer Protocol (HTTP), etc.), and data indexing module 312. Data indexing module 312 can be a component of the data retriever 302 that is configured to perform various processing on the received data. For example, data indexing module 312 can sort information associate with base stations stored in the base station information table 308 based on identifiers of detected base stations. Data indexing module 312 can also group the received data into sets based on time periods. For example, a new set of received data can be created for a configurable period of time.

Sets of received data can be stored in temporary data repository 321. Temporary data repository 321 can include an object-oriented repository, an ad-hoc repository, or a relational repository. Temporary data repository 321 can be hosted locally or remotely in relation to system 300.

Data processor 304 can include first data filter 313. First data filter 313 is configured to analyze the received data points and filter out one or more outliers from the received data. Filtering out the one or more outliers can reduce a probability that a defective estimated geographic location of a base station is used in subsequent computations. Further details of filtering out outliers will be described below in reference to FIG. 4. The outlier data point can be stored in bad data repository 322. Bad data repository 322 can be hosted locally or remotely in relation to system 300.

Data combiner 314 can be a component of data processor 304. The data combiner 314 is configured to combine current data, which can be received from first data filter 313, and historical data. The historical data can be received from a historical data repository 324. In some implementations, the current data points associated with an access point (e.g., access point 102*a*) can include a Mobile Country Code (MCC) and an identifier (e.g., MAC address) of the access point. Data combiner 314 can sort historical data from historical data repository 324 using information about the MCC and MAC. In some implementations, the current data points associated with a cell tower (e.g., cell tower 101*a*) can include a cell global identifier, such as Mobile Country Code (MCC), Mobile Network Code (MNC), Local Area Code (LAC), and cell identifier (cell id). Data combiner 314 can sort historical data stored in the historical data repository 324 using information about the cell global identifier (e.g., MCC, MNC, LAC, and cell id). The combined data can be stored in the historical data repository 324. The historical data repository 324 can include an object-oriented database, an ad-hoc database, or a relational database. The historical data repository 324 can be hosted locally or remotely in relation to system 300.

Data processor 304 can also include second data filter 315. Second data filter 315 is configured to analyze the combined data points and filter out one or more outliers from the combined data. Filtering out the one or more outliers can reduce a probability that a defective estimated geographic location of a base station is used in subsequent computations. Further details of filtering out outliers will be described below in reference to FIG. 4.

Location estimator 306 can include position estimator 316. Position estimator 316 can be utilized to determine an estimated location of a base station (e.g., access point 102*a*) in a particular set of data points. Based on an estimated geographic location of each of the base stations, position estimator 316 can calculate an uncertainty value using the data points in the received set of locations. Further details of calculating base station location will be discussed below in reference to FIG. 5. Location estimator 306 can include parameter estimator 317. Parameter estimator 317 can be utilized to calculate coverage area length of base stations and transmission signal range of base stations.

The base station information table 308 can be a database or a data repository. The base station information table 308 can include a list of location data for each base station. Location data for each base station can include identifier information, a geographic location of the base station, an uncertainty value of each geographic location, a coverage area length of the base station, and a transmission signal range of the base station. The identifier information associated with a cell tower can include a cell global identifier, such as MCC, MNC, LAC, and cell identifier (cell id); the identifier information associated with an access point can include a MCC and a MAC address. The base station information table 308 can be hosted locally or remotely in relation to system 300.

Figure 4:
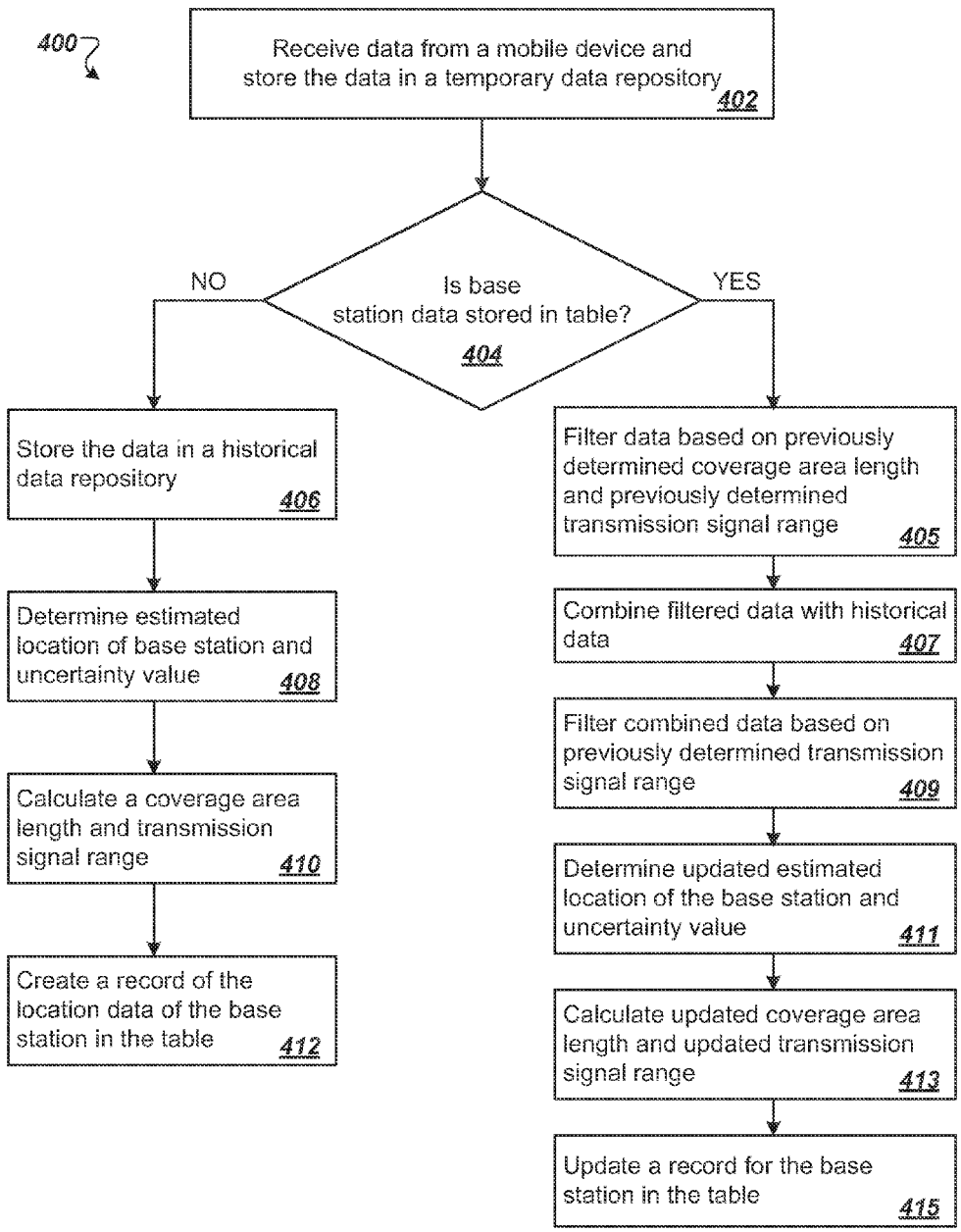
FIG. 4 is a flowchart showing examples of operations for determining an estimated location of a base station using locations of a mobile device.

FIG. 4 is a flowchart showing examples of operations 400 for determining an estimated location of a base station. Process 400 will be described in reference to system 300 that performs the operations 400.

At 402, the system 300 can receive data from a mobile device, e.g., a GNSS-enabled mobile device, and store the received data in a temporary data repository 321. The mobile device can be a mobile device, such as the mobile device 104 described in FIG. 2, that can perform access scanning operations to detect multiple base stations observed by mobile device. A data point in the received data can include the location of the mobile device that is associated with an identifier of a base station (e.g., a cell global identifier or a MAC address), as well as a RSSI value measured at mobile device. The location of mobile device can be represented by a latitude coordinate and a longitude coordinate of the mobile device. In some implementations, the location of mobile device can include an altitude coordinate of the mobile device.

At 404, system 300 can identify each of the base stations within a communication range of which mobile device is located. Each of base stations can include at least one of a cell tower, an access point, or a Bluetooth device. For example, the mobile device may be located within a communication range of cell tower. In addition, mobile device 104 may be located within communication ranges of access points. Mobile device can identify a cell tower by a cell global identifier (e.g., MCC, MNC, LAC, and cell id). Mobile device can identify access points under wireless communication protocols used in WLAN (e.g., IEEE 802.11n). Access points can be identified by MAC addresses or other identifiers (e.g., Bluetooth identifiers). System 300 can use the base station to determine whether to update (or to create) a record of in the base station information table 308 that is hosted on system 300. The base station information table 308 can include records of base station data previously received from mobile device.

At 404, system 300 can determine whether the base stations detected by mobile device are included in the records of the base station information table 308. The system 300 can perform a lookup of the base station information table 308 using identifier information of the base stations within a communication range of which mobile device is located. As an example, information associated with an access point can include a MCC and a MAC address. The system can sort information stored in the base station information table 308 using the MCC and/or the MAC. As another example, information associated with a cell tower can include MCC, MNC, LAC, and cell id. The system 300 can sort information stored in the base station information table 308 using the MCC, the MNC, the LAC, and/or the cell id. If the base station is not included in the records of the base station information table 308, the system 300 can determine that record needs to be created in the base station information table 308. If the base station is included in the records of the base station information table 308, the system 300 can determine that the base station information table 308 needs to update the record.

If the system 300 does not find the information in the base station information table 308 at 404, the system 300 can store the received data in the historical data repository 323 at 406. At 408, the system 300 can request that the position estimator 316 determine the estimated base station location and the uncertainty value of the estimated geographic location. The calculation can be performed using an adaptive two-level process. Further details of the two-level process will be described below with respect to FIG. 5. Although additional information (e.g., RSSI received from the current base station) can assist the calculation of the geographic location, this information is not required in the calculation.

At 410, system 300 can request that parameter estimator 317 determine a coverage area length of the base station. The calculation can be performed by using a bounding box process associated with the estimated geographic location of the base station determined at 408. The bounding box can be determined using extreme points as a rectangular area that contains the estimated geographic location of the base station as a center. The extreme points (e.g., easternmost, westernmost, northernmost, and southernmost points) within the boundaries of the bounding box can be calculated using the received locations of the mobile device that can be configured to four sets of coordinates. For example, the bounding box can have a northern and a southern boundary that is delineated by the latitude coordinate of the geographic location of the base station within which a 95 percent of latitude coordinate of received locations are located. The bounding box can have an eastern and a western boundary respectively that is delineated by the longitude coordinate of geographic location of the base station within which a 95 percent of longitude coordinate of received locations are located. The coverage area length can be a length that corresponds to the longest distance between two extreme points in the bounding box. The coverage area length can differ from base station to base station, based on the distribution pattern of the received locations (e.g., the number of the received data, the density of the received data, and the concentration area in the base stations). In some implementations, a coverage area length can be sufficiency small where mobile devices are highly concentrated. Parameter estimator 317 can also determine a transmission signal range of the base station. The calculation can be performed by using a statistical tolerance interval associated with sets of RSSI values measured at the mobile devices. Assuming the distribution of RSSI values in the received set can be a Gaussian distribution that contains an average RSSI value as a mean, a percentage of RSSI values (e.g., 95 percent of RSSI values) can be configured as the tolerance interval. The transmission signal range can be a value that corresponds to a minimum RSSI value within which a 95 percent of RSSI values in the set of locations are measured.

At 412, system 300 can request data indexing module 312 to create a record of the location data of the base station in base station information table 308. The location data can include the identifier information, the estimated geographic location of the base station, the uncertainty value of estimated geographic location, the coverage area length of the base station, and the transmission signal range of the base station. In addition, the base station information table 308 can record additional information, including an amount of the data received and a timestamp.

If the system 300 can find the information in the base station information table 308 at 404, the system 300 can send the data received from the mobile device to a first data filter 313. At 405, system 300 can exclude from the received data at least one data point based on (1) a previously determined coverage area length associated with the base station stored in the base station information table 308, and (2) a previously determined transmission signal strength associated with the base station stored in the base station information table 308.

To filter the received data, system 300 can request that the first data filter 313 determine whether a set of locations of the mobile device is within an area encompassed by a circle. The previously estimated geographic location associated with the base station can be designated as a center of the circle. The center of the circle need not coincide with the physical geographic location of the base station. The first data filter 313 can calculate distances between the previously estimated geographic location of the base station and each geographic location in the set of locations received from the mobile device and identify one or more outliers. Outliers can be the locations of mobile device in the set of locations that are located the farthest from the previously estimated geographic location of the base station. Outliers whose distances to the center exceed a coverage area radius, or half the coverage area length, can be excluded from the set.

System 300 can further request the first data filter 313 to exclude from the set of outliers at least one location based on a previously determined transmission signal range. In some implementations, the first data filter 313 can exclude the locations of mobile device in the set whose RSSI value is associated with a transmission signal range that exceeds a previously determined transmission signal range. If the location of mobile device tagged with a RSSI value is within a previously determined coverage area length and a previously determined transmission signal range, the first data filter 313 can send the data to the data combiner 314. Otherwise, the first data filter 313 can store the data in the bad data repository 322, which can be periodically deleted.

At 407, system 300 can request that the data combiner 314 combine the filtered data with historical data stored in the historical data repository 324. The filtered data can be the received data filtered by first data filter 313. The filtered data points associated with the base station (e.g., an access point) can include an identifier (e.g., a MAC address). In some implementations, the filtered data points can also include information on which country (e.g., MCC) mobile device is located. Data combiner 314 can sort historical data from the historical data repository 324 using information about the MCC and/or the MAC associated with the filtered data. The combined data can be stored in the historical data repository 324 to update the historical data stored in a historical data repository 324. Data combiner 314 can send the combined data to a second data filter 315.

At 409, system 300 can exclude from the combined data at least one data point based on a previously determined transmission signal range associated with the base station stored in the base station information table 308. To filter the combined data, system 300 can request that the second data filter 315 determine whether a set of locations of the mobile device whose RSSI value is associated with a transmission signal range that exceeds a previously determined transmission signal range. The second data filter 315 can identify one or more outliers. Outliers can be the locations of mobile device in the combined data that may possibly be locate the farthest from the previously estimated location of the base station.

At 411, the system 300 can request that position estimator 316 determine the base station location based on the filtered data. The filtered data can be the combined data filtered by second data filter 315. Position estimator 316 can calculate an uncertainty value based on the estimated geographic location of the base station. Although additional information (e.g., RSSI received from the base station) can assist the calculation of the geographic location, this information is not required in the calculation. The base station location calculation can be performed by using an adaptive two-level process. Further details of the two-level process will be described below with respect to FIG. 5.

At 413, system 300 can request that parameter estimator 317 determine an updated coverage area length of the base station. A bounding box process associated with the estimated geographic location of base station can be used to estimate the coverage area length. The bounding box can be determined using extreme points as a rectangular area that contains the estimated geographic location of the base station as a center. The extreme points (e.g., easternmost, westernmost, northernmost, and southernmost points) within the boundaries of the bounding box can be calculated using the locations of mobile device combined at 407. Assuming the distribution of locations of mobile device combined at 407 can be a Gaussian distribution that contains the estimated geographic location of the base station as a mean, a percentage of positions (e.g., 95 percent of locations) can be used to determine four sets of coordinates as extreme points. For example, the bounding box can have a northern and a southern boundary respectively that is delineated by the latitude coordinate of the geographic location of the base station within which a 95 percent of latitude coordinate of locations in combined locations at 407 are located. The bounding box can have an eastern and a western boundary respectively that is delineated by the longitude coordinate of geographic location of the base station within which a 95 percent of longitude coordinate of locations combined locations at 407 are located. The coverage area length can be a length that corresponds to the longest distance between two extreme points in the bounding box.

Parameter estimator 317 can also determine an updated transmission signal range of the base station. A statistical tolerance interval associated with sets of RSSI values measured at mobile device can be used to estimate the transmission signal range. Assuming the distribution of RSSI values in the combined locations at 407 can be a Gaussian distribution that contains an average RSSI value as a mean, a percentage of RSSI values (e.g., 95 percent of RSSI values) can be configured as the tolerance interval. The transmission signal range can be a value that corresponds to a minimum RSSI value within which a 95 percent of RSSI values in the combined locations are measured.

At 415, system 300 can request that data indexing module 312 update a record of the location data of the base station stored in base station information table 308. The location data can include the identifier information, the estimated geographic location of base station, the uncertainty value of estimated geographic location, the coverage area length of the base station, the transmission signal range of the base station. In addition, the base station information table 308 can record additional information, including an amount of the data received and a timestamp.

Figure 5:
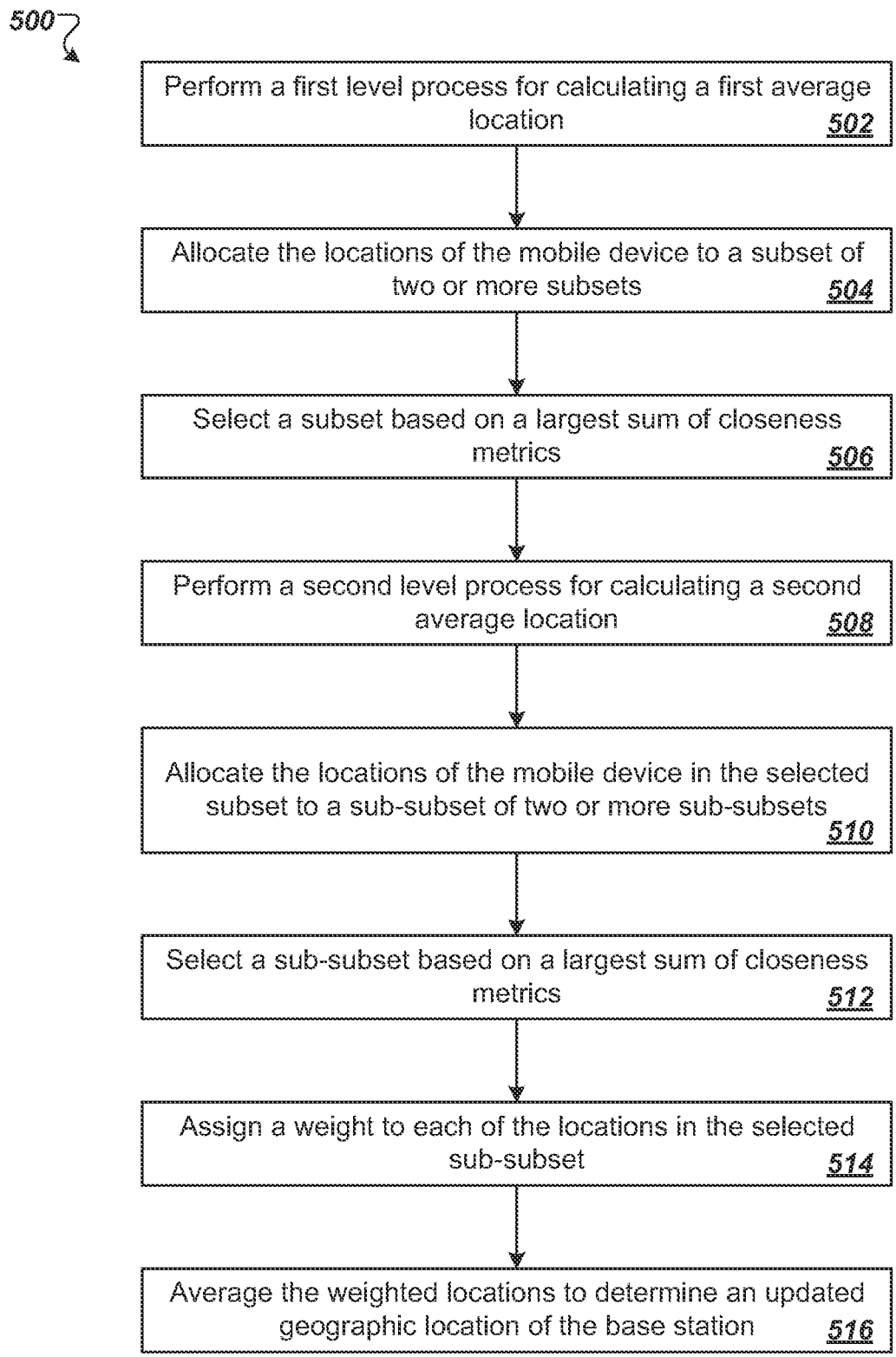
FIG. 5 is a flowchart showing examples of operations of an adaptive two-level process for determining an estimated location of a base station.

FIG. 5 is a flowchart showing examples of operations 500 of an adaptive two-level process for determining an estimated location of a base station using received locations of the mobile device 104. For convenience, the operations 500 will be described in reference to a system that performs the operations 500. At 502, the system can perform a first level process for determining an estimated location of a base station. The system can calculate, using the received locations of the mobile device, a first average location of a base station, which can be a coarse location. The locations of the mobile device can be represented by geographic coordinates, including a latitude coordinate and a longitude coordinate. In some implementations, the geographic coordinates of the mobile device can include an altitude coordinate. Calculating the first average location can include calculating an average of latitudes and longitudes of locations in the set, and designating a position at the calculated average latitude and longitude as the first average location. In some implementations, calculating the first average location can include calculating an average of altitudes of locations in the set such that an average location can include the calculated average altitude.

At 504, the system can use the calculated average longitude to allocate the locations of the mobile device to a subset of two or more subsets. The calculated average longitude coordinate can be a threshold value. The system can allocate the locations of the mobile device to a subset whose longitude coordinate of locations of the mobile device exceeds a threshold. The system can allocate the locations of the mobile device to another subset whose the longitude coordinate of locations of the mobile device does not exceed the threshold. Each subset can include an amount of locations of the mobile device. Each of the locations of the mobile device can tag a RSSI value of the base station.

At 506, the system can exclude from the subsets at least one subset based on the sum of all closeness metrics in each subset. Each of the locations of the mobile device in the subset can include a closeness metric. In some implementations, the closeness metric can be determined using a RSSI measured at the mobile device. In some implementations, the closeness metric can be determined by a distance between the mobile device and the base station. In some implementations, the closeness metric can be determined using a round trip time of a signal between the mobile device and the base station. The closeness metric need not correspond to a physical distance between the mobile device and the base station. The closeness metric can be an initial measurement of an RSSI as measured at the mobile device from the base station. In calculating the closeness metric, a higher RSSI received at the mobile device from the base station can provide a larger closeness metric. The sum of all closeness metrics in each subset can be calculated using the following formula:

$$C = \sum_{i=1}^{N} e^{\left(-\frac{S_i}{\overline{S}}\right)f},\qquad(1)$$

where $S_i$ is an RSSI measured at location i of the mobile device; $\overline{S}$ is a mean of RSSI values; i=1, ..., N is a number of locations of the mobile device in each subset; and f is a constant proportional factor. The system can exclude a subset whose sum of closeness metrics between the mobile device and the base station is a smaller value. In this level of the two-level process, the system can increase a precision of the estimated geographic location of the base station by excluding locations of the mobile device that appear to be far away from the physical geographic location of the base station and can be less useful in estimating the geographic location of the base station.

At 508, system can perform second level process for determining an estimated location of the base station. The system can calculate, using the locations of the mobile device in the selected subset, a second average location of a base station, which can be a finer location.

At 510, the system can use the calculated average latitude to allocate the locations of mobile device in the selected subset to a sub-subset of two or more sub-subsets. The calculated average latitude coordinate can be a threshold value. The system can allocate locations of the mobile device in the selected subset to a sub-subset whose latitude coordinate of the location of the mobile device exceeds a threshold. The system can allocate locations of the mobile device in the selected subset to another sub subset whose the latitude coordinate of location of the mobile device does not exceed the threshold. Each sub-subset can include an amount of locations of the mobile device. Each of locations of the mobile device can tag a RSSI value of the base station.

At 512, the system can exclude from the sub-subsets at least one sub-subset based on the sum of all closeness metrics in each sub-subset. Each of locations of the mobile device in the sub-subset can include a closeness metric. The sum of all closeness metrics in each sub-subset can be calculated using the formula (1). The system can exclude a sub-subset whose closeness metric between the mobile device and the base station is a smaller value. In this level of two-level process, the system can further increase a precision of the estimated geographic location of the base station by excluding locations of the mobile device that appear to be far away from the physical geographic location of the base station and can be less useful in estimating the geographic location of the base station.

At 514 and 516, the system can estimate the base station location using the locations of mobile device in the selected sub-subset. The location estimation can include assigning a weight to each of the locations of the mobile device at 514 and averaging the weighted locations to determine an updated geographic location of the base station at 516. Assigning a weight to each of locations can include assigning a weight to each of the latitudes and the longitudes of the locations in the selected sub-subset. The weight of a location can be determined by a distance to a finer location calculated by the second-level process at 508. Calculating the average location can include calculating an average of weighted latitudes and an average of weighted longitudes of locations in the selected sub-subset, and designating a position at the calculated average latitude and the calculated average longitude as the estimated geographic location. The estimated geographic location need not correspond to the physical geographic location of the base station. In weighting the location using the distance, a greater distance between the mobile device and the base station can provide a lower weight of the location of the mobile device. The weight of a location of the mobile device can be measured using the following formula:

$$W = -10\log_{10}d_i - 10\log_{10}d_{max},\qquad(2)$$

where $d_i$ is the distance between the mobile device at location i and the finer location calculated at 508, and $d_{max}$ is a maximum distance value.

The system can determine, based on the locations of mobile device in the subset selected at 506, an estimated uncertainty associated with the estimated geographic location of the base station by applying circular error probable (CEP) theory to calculate 95% radius of the estimated geographic location of the base station. The uncertainty value can differ from base station to base station, based on the distribution pattern of the locations in the selected subset at 506 (e.g., number of the locations, density of the locations, and location concentration area of the base stations). In some implementations, an uncertainty value can be sufficiently small where mobile devices are highly concentrated.

The features as described in reference to FIGS. 1-5 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C), including compiled or interpreted languages, and can be deployed in any form, including as a stand-alone program or as a module, component, a browser-based web application, or other unit suitable for use in a computing environment.

The features can be performed in a computer system that can include a back-end component (e.g., data server), or that can include a middleware component (e.g., an application server), or that can include a front-end component (e.g., a computer having a graphical user interface or an Internet browser), or any combination of them. The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A few implementations have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations. Other implementations fall within the scope of the following claims.

What is claimed is:

1. A method performed by a server system, the method comprising:
   receiving a set of identifiers of base stations within a communication range of a mobile device, each identifier of the set of identifiers of the base stations associated with a set of locations of the mobile device, each location of the set of locations of the mobile device associated with a received signal strength indication from each of the base stations;
   accessing a base station information table based on the set of identifiers, wherein the base station information table stores previously determined location data associated with each of the base stations, the previously determined location data associated with each of the base stations including an estimated geographic location of the base station, an uncertainty value of the estimated geographic location, a coverage area length of the base station, and a transmission signal range of the base station;
   excluding at least one location of the mobile device from the set of locations using at least one of the previously determined coverage area length stored in the base station information table and at least one of the previously determined transmission signal range stored in the base station information table;
   determining, by processing circuitry of the server system, updated location data of each of the base stations using non-excluded locations of the set of locations of the mobile device; and
   updating the base station information table with the updated location data of each of the base stations.

2. The method of claim 1, wherein each of the base stations includes at least one of a cell tower, a WiFi access point, or a Bluetooth device.

3. The method of claim 1, wherein excluding the at least one location of the mobile device from the set of locations comprises excluding the at least one location of the mobile device based on the at least one location having a distance to a previously determined estimated geographic location that exceeds the at least one of the previously determined coverage area length.

4. The method of claim 1, wherein excluding the at least one location of the mobile device from the set of locations comprises excluding the at least one location of the mobile device based on the at least one location being associated with a received signal strength indication corresponding to a transmission signal range that exceeds the at least one of the previously determined transmission signal range.

5. The method of claim 1, wherein determining the updated location data of each of the base stations comprises:
   calculating a first average geographic location using the non-excluded locations of the mobile device;
   allocating the non-excluded locations of the mobile device to a subset of two or more subsets based on the first average geographic location;
   for each of the two or more subsets, calculating a sum of closeness metrics associated with the non-excluded locations in the subset;
   selecting a first subset from the two or more subsets based on the calculated sums for the two or more subsets;
   calculating a second average geographic location using locations of the mobile device in the first subset;
   allocating the locations of the mobile device in the first subset to a sub-subset of two or more sub-subsets based on the second average geographic location;
   for each of the two or more sub-subsets, calculating a sum of closeness metrics associated with locations in the sub-subset;
   selecting a second subset from the two or more sub-subsets based on the calculated sums for the two or more sub-subsets;
   assigning a weight to each location of the mobile device in the second subset; and
   calculating an updated estimated geographic location of the base station by averaging the weighted locations of the mobile device in the second subset.

6. The method of claim 5, wherein:
   calculating the first average geographic location comprises:
      calculating a first average latitude and a first average longitude based on latitudes and longitudes of the non-excluded locations, and
      designating the first average latitude and the first average longitude as the first average geographic location; and
   calculating the second average geographic location comprises:
      calculating a second average latitude and a second average longitude based on latitudes and longitudes of the locations in the first subset, and
      designating the second average latitude and the second average longitude as the second average geographic location.

7. The method of claim 6, wherein:
   allocating the non-excluded locations of the mobile device is based on at least one of the first average latitude or the first average longitude; and
   allocating the locations of the mobile device in the first subset is based on at least one of the second average latitude or the second average longitude.

8. The method of claim 5, wherein:
   calculating the sum of closeness metrics associated with the non-excluded locations in the subset includes calculating a closeness metric for each of the non-excluded locations in the subset based on the received signal strength indication associated with the non-excluded location; and
   calculating the sum of closeness metrics associated with the locations in the sub-subset includes calculating a closeness metric for each of the locations in the sub-subset based on the received signal strength indication associated with the location in the sub-subset.

9. The method of claim 8, wherein calculating a closeness metric for a location comprises assigning a larger closeness metric to the location for a high received signal strength indication relative to a low received signal strength indication.

10. The method of claim 5, wherein:
selecting the first subset includes selecting a subset from the two or more subsets having a largest of the calculated sums for the two or more subsets; and
selecting the second subset includes selecting a subset from the two or more sub-subsets having a largest of the calculated sums for the two or more sub-subsets.

11. The method of claim 5, wherein assigning the weight to each location of the mobile device in the second subset comprises assigning a larger weight to a location of the mobile device that is closer to the base station relative to a location of the mobile device that is farther from the base station.

12. The method of claim 5, wherein calculating the updated estimated geographic location of the base station comprises:
calculating an average of weighted latitudes and an average of weighted longitudes of the weighted locations; and
designating the calculated average of the weighted latitudes and the calculated average of the weighted longitudes as the updated estimated geographic location of the base station.

13. The method of claim 1, wherein determining the updated location data of each of the base stations comprises calculating an uncertainty value of an updated estimated geographic location of the base station including calculating 95% radius of the updated estimated geographic location of the base station using circular error probable (CEP) theory.

14. The method of claim 1, wherein determining the updated location data of each of the base stations comprises:
determining locations of the mobile device that are to be used to calculate an updated coverage area length based on a threshold percentage of locations of the set of locations of the mobile device;
designating four sets of coordinates as extreme points of an area that includes an updated estimated geographic location of the base station based on the locations of the mobile device that are to be used to calculate the updated coverage area length; and
calculating the updated coverage area length to be a length that corresponds to a longest distance between two of the extreme points.

15. The method of claim 1, wherein determining the updated location data of each of the base stations comprises:
determining received signal strength indications that are to be used to determine an updated transmission signal range based on a threshold percentage of received signal strength indications associated with the set of locations of the mobile device;
designating, as the updated transmission signal range, a value that corresponds to a minimum of the received signal strength indications.

16. A system, comprising:
a server system that includes processing circuitry configured to perform operations comprising:
receiving a set of identifiers of base stations within a communication range of a mobile device, each identifier of the set of identifiers of the base stations associated with a set of locations of the mobile device, each location of the set of locations of the mobile device associated with a received signal strength indication from each of the base stations;
accessing a base station information table based on the set of identifiers, wherein the base station information table stores previously determined location data associated with each of the base stations, the previously determined location data associated with each of the base stations including an estimated geographic location of the base station, an uncertainty value of the estimated geographic location, a coverage area length of the base station, and a transmission signal range of the base station;
excluding at least one location of the mobile device from the set of locations using at least one of the previously determined coverage area length stored in the base station information table and at least one of the previously determined transmission signal range stored in the base station information table;
determining updated location data of each of the base stations using non-excluded locations of the set of locations of the mobile device; and
updating the base station information table with the updated location data of each of the base stations.

17. The system of claim 16, wherein each of the base stations includes at least one of a cell tower, a WiFi access point, or a Bluetooth device.

18. The system of claim 16, wherein excluding the at least one location of the mobile device from the set of locations comprises excluding the at least one location of the mobile device based on the at least one location having a distance to a previously determined estimated geographic location that exceeds the at least one of the previously determined coverage area length.

19. The system of claim 16, wherein excluding the at least one location of the mobile device from the set of locations comprises excluding the at least one location of the mobile device based on the at least one location being associated with a received signal strength indication corresponding to a transmission signal range that exceeds the at least one of the previously determined transmission signal range.

20. The system of claim 16, wherein determining the updated location data of each of the base stations comprises:
calculating a first average geographic location using the non-excluded locations of the mobile device;
allocating the non-excluded locations of the mobile device to a subset of two or more subsets based on the first average geographic location;
for each of the two or more subsets, calculating a sum of closeness metrics associated with the non-excluded locations in the subset;
selecting a first subset from the two or more subsets based on the calculated sums for the two or more subsets;
calculating a second average geographic location using locations of the mobile device in the first subset;
allocating the locations of the mobile device in the first subset to a sub-subset of two or more sub-subsets based on the second average geographic location;
for each of the two or more sub-subsets, calculating a sum of closeness metrics associated with locations in the sub-subset;
selecting a second subset from the two or more sub-subsets based on the calculated sums for the two or more sub-subsets;
assigning a weight to each location of the mobile device in the second subset; and
calculating an updated estimated geographic location of the base station by averaging the weighted locations of the mobile device in the second subset.

21. The system of claim 20, wherein:
calculating the first average geographic location comprises:
calculating a first average latitude and a first average latitude based on latitudes and longitudes of the non-excluded locations, and
designating the first average latitude and the first average longitude as the first average geographic location; and calculating the second average geographic location comprises:
  calculating a second average latitude and a second average longitude based on latitudes and longitudes of the locations in the first subset; and
  designating the second average latitude and the second average longitude as the second average geographic location.

22. The system of claim 21, wherein:
allocating the non-excluded locations of the mobile device is based on at least one of the first average latitude or the first average longitude; and
allocating the locations of the mobile device in the first subset is based on at least one of the second average latitude or the second average longitude.

23. The system of claim 20, wherein:
calculating the sum of closeness metrics associated with the non-excluded locations in the subset includes calculating a closeness metric for each of the non-excluded locations in the subset based on the received signal strength indication associated with the non-excluded location; and
calculating the sum of closeness metrics associated with the locations in the sub-subset includes calculating a closeness metric for each of the locations in the sub-subset based on the received signal strength indication associated with the location in the sub-subset.

24. The system of claim 23, wherein calculating a closeness metric for a location comprises assigning a larger closeness metric to the location a high received signal strength indication relative to a low received signal strength indication.

25. The system of claim 20, wherein:
selecting the first subset includes selecting a subset from the two or more subsets having a largest of the calculated sums for the two or more subsets; and
selecting the second subset includes selecting a subset from the two or more sub-subsets having a largest of the calculated sums for the two or more sub-subsets.

26. The system of claim 20, wherein assigning the weight to each location of the mobile device in the second subset comprises assigning a larger weight to a location of the mobile device that is closer to the base station relative to a location of the mobile device that is farther from the base station.

27. The system of claim 20, wherein calculating the updated estimated geographic location of the base station comprises:
  calculating an average of weighted latitudes and an average of weighted longitudes of the weighted locations; and
  designating the calculated average of the weighted latitudes and the calculated average of the weighted longitudes as the updated estimated geographic location of the base station.

28. The system of claim 16, wherein determining the updated location data of each of the base stations comprises calculating an uncertainty value of an updated estimated geographic location including calculating 95% radius of the updated estimated geographic location of the base station using circular error probable (CEP) theory.

29. The system of claim 16, wherein determining the updated location data of each of the base stations comprises:
  determining locations of the mobile device that are to be used to calculate an updated coverage area length based on a threshold percentage of locations of the set of locations of the mobile device;
  designating four sets of coordinates as extreme points of an area that includes an updated estimated geographic location of the base station based on the locations of the mobile device that are to be used to calculate the updated coverage area length; and
  calculating the updated coverage area length be a length that corresponds to a longest distance between two of the extreme points.

30. The system of claim 16, wherein determining the updated location data of each of the base stations comprises:
  determining received signal strength indications that are to be used to determine an updated transmission signal range based on a threshold percentage of received signal strength indications associated with the set of locations of the mobile device;
  designating, as the updated transmission signal range, a value that corresponds to a minimum of the received signal strength indications.

* * * * *